United States Patent
Stafford et al.

(10) Patent No.: US 7,433,391 B2
(45) Date of Patent: Oct. 7, 2008

(54) SPREAD-SPECTRUM RECEIVER WITH FAST M-SEQUENCE TRANSFORM

(75) Inventors: James F. Stafford, Ashburn, VA (US); Scott A. McDermott, Washington, DC (US); William F. Seng, Purcellville, VA (US)

(73) Assignee: AeroAstro, Inc., Ashburn, VA (US)

( * ) Notice: Subject to any disclaimer, the term of this patent is extended or adjusted under 35 U.S.C. 154(b) by 0 days.

(21) Appl. No.: 11/681,759

(22) Filed: Mar. 3, 2007

(65) Prior Publication Data

US 2007/0195862 A1    Aug. 23, 2007

Related U.S. Application Data

(63) Continuation-in-part of application No. 10/208,882, filed on Jul. 31, 2002, now Pat. No. 7,227,884, which is a continuation-in-part of application No. 09/513,962, filed on Feb. 28, 2000, now Pat. No. 6,985,512.

(60) Provisional application No. 60/779,524, filed on Mar. 6, 2006, provisional application No. 60/779,525, filed on Mar. 6, 2006.

(51) Int. Cl.
*H04B 1/69* (2006.01)
*H04B 1/707* (2006.01)
*H04B 1/713* (2006.01)

(52) U.S. Cl. .................. 375/150; 375/147; 375/142; 375/149; 370/342; 370/320; 370/335

(58) Field of Classification Search ............. 375/147, 375/150, 142, 149, 145; 370/342, 320, 335
See application file for complete search history.

(56) References Cited

U.S. PATENT DOCUMENTS

| | | | |
|---|---|---|---|
| 4,876,737 A | 10/1989 | Woodworth et al. | |
| 4,901,307 A | 2/1990 | Gilhousen et al. | |
| 5,109,390 A | 4/1992 | Gilhousen et al. | |
| 5,490,165 A * | 2/1996 | Blakeney et al. | 370/335 |
| 5,537,397 A | 7/1996 | Abramson | |
| 5,566,168 A | 10/1996 | Dent | |
| 5,668,556 A | 9/1997 | Rouffet et al. | |
| 5,697,050 A | 12/1997 | Wiedeman | |
| 5,758,260 A | 5/1998 | Wiedeman | |
| 5,790,070 A | 8/1998 | Natarajan et al. | |
| 6,052,561 A | 4/2000 | Rudowicz et al. | |
| 6,128,469 A | 10/2000 | Zenick et al. | |
| 6,151,313 A | 11/2000 | Abramson | |
| 6,185,245 B1 | 2/2001 | Kim | |

(Continued)

*Primary Examiner*—Phuong Phu
(74) *Attorney, Agent, or Firm*—Robert M. McDermott, Esq.

(57) ABSTRACT

A receiving system dynamically searches a communications band for transmissions of messages having the same nominal communications parameters, including the use of the same spreading code, but having potentially different specific frequencies and code-phases. The receiver samples the communications band at each code-phase of the spreading code over a span of down-converted transmission frequencies. When a message element is detected at a particular code-phase and frequency, it is forwarded to a demodulator that demodulates the message and sends it to its intended destination. This technique allows each transmitter to be independent of the receiver. In a preferred embodiment of this invention, a Fast M-Sequence Transform (a Walsh-Hadamard Transform) is used to determine the power level at multiple code-phases at a given frequency in parallel, thereby substantially reducing the time required to search for transmissions at each discrete code-phase.

27 Claims, 4 Drawing Sheets

U.S. PATENT DOCUMENTS

| | | |
|---|---|---|
| 6,188,682 B1 | 2/2001 | Takagi et al. |
| 6,205,167 B1 | 3/2001 | Kamgar et al. |
| 6,307,840 B1 * | 10/2001 | Wheatley et al. ............ 370/252 |
| 6,317,029 B1 | 11/2001 | Fleeter |
| 6,339,611 B1 | 1/2002 | Antonio et al. |
| 6,373,831 B1 | 4/2002 | Secord et al. |
| 6,396,819 B1 | 5/2002 | Fleeter et al. |
| 6,421,373 B1 | 7/2002 | Saito |
| 6,510,172 B1 * | 1/2003 | Miller ........................ 375/140 |
| 6,549,559 B2 | 4/2003 | Kamgar et al. |
| 6,574,205 B1 | 6/2003 | Sato |
| 6,639,906 B1 * | 10/2003 | Levin ......................... 370/342 |
| 6,754,190 B2 * | 6/2004 | Gurney et al. ............... 370/329 |
| 6,894,995 B2 * | 5/2005 | Chitrapu et al. ............. 370/335 |
| 6,944,149 B1 * | 9/2005 | Kim et al. ................... 370/349 |
| 6,985,512 B1 | 1/2006 | McDermott et al. |

* cited by examiner

FIG. 1 [Prior Art]

SPREAD-SPECTRUM RECEIVER WITH FAST M-SEQUENCE TRANSFORM

This is a continuation-in-part of U.S. patent application Ser. No. 10/208,882, filed 31 Jul. 2002 now U.S. Pat. No. 7,227,884, which is a continuation-in-part of U.S. patent application Ser. No. 09/513,962 now U.S. Pat. No. 6,985,512, filed 28 Feb. 2000 and issued 10 Jan. 2006, each of which are incorporated by reference herein. This application also claims the benefit of U.S. Provisional Patent application 60/779,524, and 60/779,525, filed 6 Mar. 2006.

BACKGROUND AND SUMMARY OF THE INVENTION

This invention relates to the field of communications, and in particular to the processing of multiple asynchronous spread-spectrum communications.

The Spread-Spectrum techniques are used to modulate an information signal such that the modulated signal appears as noise. The information is modulated by a pseudo-random signal, and can be demodulated, or despread, by the same pseudo-random sequence. This modulation is commonly referred to as Direct-Sequence Spread Spectrum (DSSS). The modulated signal is spread across a bandwidth that is substantially larger than the bandwidth of the information signal, and has the apparent effect of increasing the noise-floor of receivers that receive this signal. Applying the same pseudo-random sequence to the modulated signal allows the information signal to be detected within this apparent noise.

Code Division Multiple Access (CDMA) is a commonly used spread-spectrum communications technique wherein the information signal is encoded by one of many code sequences before it is transmitted. The received signal is decoded by the same code sequence to reproduce the original information signal. Transmissions from multiple transmitters can be simultaneously communicated via a common frequency channel by employing different code sequences for each transmitter, provided that the code sequences have particular uniqueness characteristics. The uniqueness characteristics of acceptable codes substantially guarantee that a coherent output will only be produced when the received signal corresponds to a signal that is encoded using the same code sequence. Signals that are not encoded using the same code sequence as the decoding code sequence are decoded as noise signals. In a conventional CDMA system, such as a cellular telephone network, the network controller allocates and deallocates code sequences on demand, so that each of the transmitters can transmit over the same network without interference from other transmitters.

A significant characteristic of a pseudo-random spread spectrum code is that a coherent output is only produced when the decoding code sequence is applied substantially in phase with the encoding code sequence. Consider, for example, a six-bit code sequence 0-1-1-0-1-0. A one-bit phase shift of this sequence is 1-1-0-1-0-0 (cyclic shift to the left); a two-bit phase shift is 1-0-1-0-0-1; and so on. If the received signal is decoded with a code-phase that corresponds to an encoding phase shifted by two bits, for example, this would be equivalent to receiving a signal having a 1-0-1-0-0-1 encoding sequence and decoding it with a 0-1-1-0-1-0 sequence. If this six-bit code is a proper pseudo-noise code, having the above defined uniqueness characteristics, then the decoding of this signal having a "different" encoding code merely produces a noise output. U.S. Pat. No. 5,537,397, "SPREAD ALOHA CDMA DATA COMMUNICATIONS", issued Jul. 16, 1996, to Norman Abramson, and incorporated by reference herein, discloses a technique that uses this phase-dependency characteristic to allow multiple transmitters to use the same code concurrently. As in the conventional CDMA system, the network controller provides an allocation to each transmitter, but in the referenced patent, each transmitter is allocated a different time-slot, or code-phase, rather than a different code. The controller instructs each transmitter to advance or delay its transmission, so that its signal is received at the receiver with a code-phase that is sufficiently different from the code-phase of other transmitters. In this manner, although each of the transmitters and the receiver use the same code, each transmitter provides a "different" (phase-shifted) code to the receiver, relative to the particular code-phase of the decoder at the time of decoding. This is the scheme that is conventionally used in most cell phone systems, wherein the base station assigns a unique phase to each transmitter in its transmission range.

The aforementioned prior art technique requires a unique identification of each mobile transmitter, because the communication of each allocated code or code-phase must be directed to the appropriate transmitter. Each mobile transmitter must also be equipped with a receiver, to receive and process the communicated phase allocation. In conventional cell-phone systems, each base station transmits a pilot signal that the mobile systems use to synchronize their code-phase to the base station's phase. Due to propagation delays and other factors, this synchronization is a 'coarse' synchronization that allows the base station to locate the transmissions within a relatively narrow timespan of when the "in-phase" transmissions should be received at the base-station. Once the in-phase signal is received at the base station, a phase-locked loop is used to assure that the base station receiver remains in sync with the mobile transmitter, to compensate for any differences between the transmitter's frequency and the receiver's frequency. That is, a separate phase locked loop is required for each currently active transmitter.

U.S. Pat. No. 6,128,469, "SATELLITE COMMUNICATION SYSTEM WITH A SWEEPING HIGH-GAIN ANTENNA", issued 3 Oct. 2000 to Ray Zenick, John Hanson, Scott McDermott, and Richard Fleeter, and U.S. Pat. No. 6,396,819, "LOW-COST SATELLITE COMMUNICATION SYSTEM", issued 28 May 2002 to Richard Fleeter, John Hanson, Scott McDermott, and Ray Zenick, and U.S. Pat. No. 6,317,029, "IN-SITU REMOTE SENSING" issued 13 Nov. 2001 to Richard Fleeter, disclose systems and methods that facilitate the reception and processing of messages from a large number of preferably low-cost transmitters, and are each incorporated by reference herein. For example, a large number of IC chip-size transmitters may be released from an aircraft that overflies a hurricane or forest fire. These transmitters may be configured to periodically or randomly transmit their location and the atmospheric conditions at their location, such as temperature, pressure, moisture content, and so on. A receiving system receives and processes the transmissions from these many devices and provides temperature and pressure profiles, changes and trends, predictions, and the like. Such systems require simple, low-cost, and efficient transmitters.

It would be advantageous to provide a receiving system that is configured to distinguish among transmissions from a plurality of transmitters that are each communicating independently at a common frequency and using a common DSSS code sequence. It would also be advantageous to provide a receiving system that distinguishes among these transmissions as the frequency and transmission rates vary among the plurality of transmitters. It would also be advantageous to provide a receiving system that does not require that each transmitter include a receiver for achieving coarse synchronization with the receiver. It would also be advantageous to provide a receiving system that does not require a separate phase-locked loop for each transmitter.

These objects and others are achieved by providing a receiving system that dynamically searches the communications band for transmissions of messages having the same nominal communications parameters, including the use of the same spreading code, but having potentially different specific frequencies and code-phases. The receiver samples the communications band at each code-phase of the spreading code over a span of down-converted transmission frequencies. When a message element is detected at a particular code-phase and frequency, it is forwarded to a demodulator that demodulates the message and sends it to its intended destination. This technique allows each transmitter to be independent of the receiver. In a preferred embodiment of this invention, a Fast M-Sequence Transform (a Walsh-Hadamard Transform) is used to determine the power level at multiple code-phases at a given frequency in parallel, thereby substantially reducing the time required to search for transmissions at each discrete code-phase.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1:
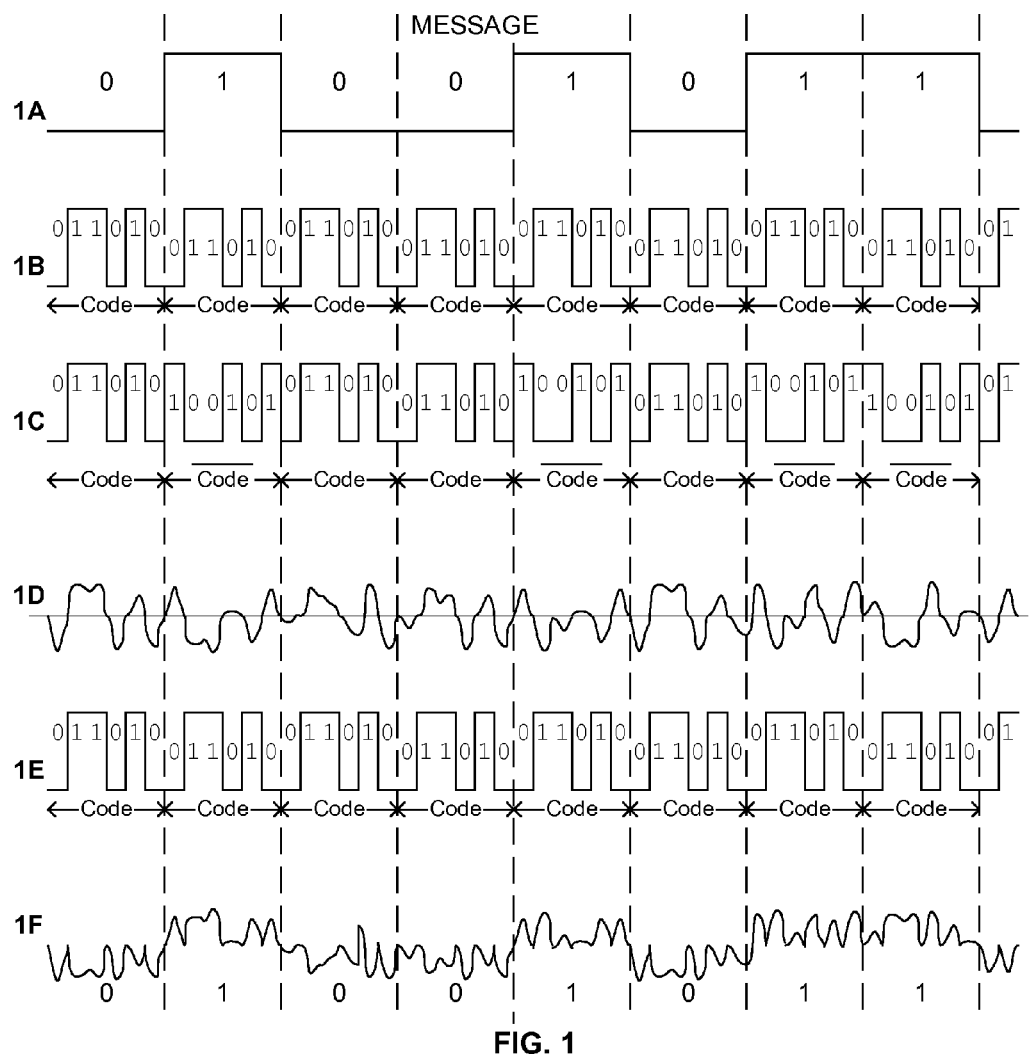
FIG. 1 illustrates an example timing diagram for an encoding and decoding process using an example six-bit spreading-code.

FIG. 1 illustrates an example timing diagram for an encoding and decoding process using an example spreading-code. Illustrated at 1A is a message sequence, consisting of an example 01001011 bit pattern. Illustrated at 1B is a code sequence, consisting of an example 011010 code pattern that is applied to each code-phase of the message. Although the example code comprises six bits, termed 'chips', conventional codes use hundreds or thousands of chips. Moreover, although the example shows only one code cycle per data bit, conventional uses may use multiple repetitions of the underlying code per data bit, or a single cycle of the code may extend across multiple bits. Generally, synchrony between the code length and the modulating data bit stream is not required, but such synchrony is often used in the art for convenience.

The timing diagram at 1C illustrates the combination of the example 011010 code being applied to each bit in the 01001011 message bit pattern. In this example, the encoding is an exclusive-or of the corresponding bits. That is, if the message bit is zero, the corresponding output is equal to the example code 011010; if the message bit is a one, the corresponding output is equal to the inverse of the code, 100101. As can be seen, this multiplexing of the message bits at 1A and the code at 1B results in a signal at 1C that changes up to six times more often than the original message. That is, the resultant signal is spread across a larger frequency range; as such, the code used to effect this increased frequency range is termed a "spreading code". The resultant higher frequency sequence illustrated at 1C is communicated to the receiving station, and subjected to noise and interference from other transmitters, and is received at the receiving station in a distorted form. Not illustrated, the sequence at 1C is typically modulated up to a higher frequency for transmission, then demodulated back, or down-converted, to the baseband frequency of the sequence at 1C. This received distorted baseband signal corresponding to the encoded message at 1C is illustrated at 1D.

At the receiver, the received signal at 1D is decoded by modulating it with the same code that was used to create the encoded signal, as illustrated at line 1E. As can be seen, decoding sequence at line 1E is identical, in value and phase, to the encoding sequence at line 1B. In this decoding, a logic value of zero in the code results in an output that is identical to the received signal, and a logic value of one in the code results in an output that is an inverse of the received signal. The decoded signal is illustrated at line 1F. As can be seen at line 1F, the regions of the decoded signal corresponding to a message bit value of "zero" have an overall signal level that is substantially lower than the regions of the decoded signal corresponding to the message bit value of "one". That is, each segment of the message bit that was inverted by a "one" in the encoding sequence (1B) is inverted again by a corresponding "one" in the decoding sequence (1E). A decoder that accumulates the energy content contained in each bit region would demonstrate a substantial negative value corresponding to each "zero" message bit, and a substantial positive value corresponding to each "one" message bit.

If the encoding sequence at 1B or the decoding sequence at 1E differ, either in value or in phase, the resultant signal at 1F will exhibit erroneous "positive" energy content segments in the regions corresponding to "zero" message bits, and erroneous "negative" energy content segments in the regions corresponding to "one" message bits. Because of this non-coherence, the energy content of each segment will tend to average out to zero, rather than exhibiting a strong "positive" or "negative" bias.

Note that in the example of FIG. 1, the received signal at 1D is illustrated as being substantially synchronous with the decoding code at 1E, in that most of the transitions of 1D occur at the transitions of 1E. However, if these signals were mis-aligned by half a chip, the resultant output at 1F would reflect each of the transitions of the received signal, rather than the information-containing peaks of the received signal. Any number of techniques may be used to prevent this occurrence, the most common of which is to sample the received signal 1D at or above the Nyquist rate of at least twice the chip rate, to obtain at least two samples of the received signal 1D during each chip. Equivalently stated, the code can be considered to contain at least twice as many code-phases as chips, so that the resolution of the code-phase is to half a chip width, or less. That is, in the above example of a 6-chip code, the alignment of the decoding code at 1E to one of 12 code-phases will assure that at least one of these code-phases will not be aligned with the transitions of the received signal 1D.

Figure 2:
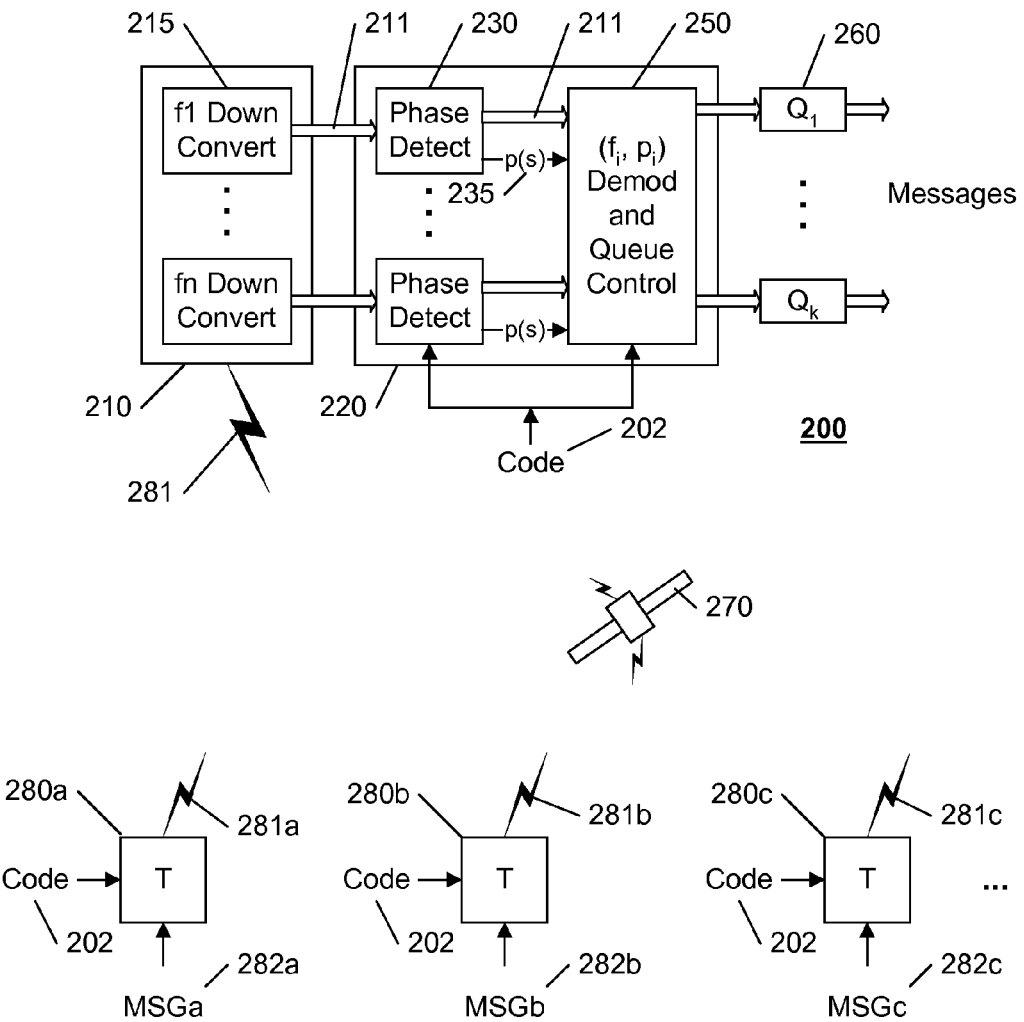
FIG. 2 illustrates an example block diagram for a communications system in accordance with this invention.

FIG. 2 illustrates an example block diagram of a communications system 200 in accordance with this invention. The communications system 200 includes a plurality of transmitters 280a-280c, a receiver 210, and a message discriminator 220. The transmitters 280a-c each provide a transmit signal 281a-c comprising a message 282a-c that is encoded using a spreading-code 202. To obtain a high degree of discrimination at different code-phases, and to optimize the decoding process, as detailed further below, a "maximal length sequence" or "M-Sequence" is preferably used as the spreading code. Maximal length sequences are simple to generate using maximal linear feedback shift registers.

Each transmitter 280a-c is substantially autonomous, and each transmitter 280a-c uses the same encoding and communications parameters, including the same spreading-code 202, and the same nominal frequency to provide the transmit signal 281a-c over the same communications channel. These transmit signals 281a-c form a composite signal 281 within this common communications channel. If two or more transmitters 280a-c transmit at the same time and at the same code-phase and essentially the same frequency, a collision results and these transmissions will not be distinguishable within the composite signal 281. If only one transmitter 280a-c is transmitting at a given code-phase, the transmitted message 282a-c will be decodable at this code-phase, as discussed with regard to FIG. 1.

There are a number of applications that include the communication of relatively short and non-critical messages. Because a typical code 202 includes a sequence of hundreds or thousands of bits, thereby forming hundreds or thousands of code-phases for each bit of a message, the likelihood of two infrequently transmitting devices transmitting at exactly the same code-phase at the same time is slight. Because the messages are non-critical, the loss of individual messages because of this possibility of an exact phase coincidence is acceptable. For example, application of U.S. Pat. No. 6,317, 029, "IN-SITU REMOTE SENSING", referenced above, includes the sensing of moisture content over a vast geographic area. Collectively, this information is useful and significant, but the intermittent loss of reports from individual collectors would not be significant. Because the odds are in favor of subsequent or prior reports from these collectors being transmitted without collision, and the rate of change of information content from these collectors can be expected to be low, the loss of individual reports has an insignificant effect on the collective information.

Other applications that are particularly well suited for this invention include, for example, cargo or container tracking; intrusion or trespass detection; emergency beacons; pipeline monitors; utility consumption meters; and so on. An infrequently transmitting beacon on a cargo container, for example, will use very little power, and can be economically provided to allow tracking of even small containers. If some intermediate reports of the container's location are lost due to collisions with other transmissions, the effect will be non-consequential. In like manner, if pressure-sensing transmitters are dispersed over an open area, pedestrian or vehicular traffic across this area can be readily detected, even if some of the transmissions from the transmitters are lost. Large areas, such as airports, harbors, bridge and tunnel accessways, and so on, can be monitored for threats by distributing nuclear, chemical, or biological sensors throughout the area. In like manner, such sensors could be placed at intervals along all major roadways leading to a metropolitan area. If many such sensors are distributed, the alarms will be triggered sequentially, as the hazard material is moved from one sensor's coverage area to the next, and the likelihood of interference would be minimal. Similarly, an emergency beacon need only be detected once to have a desired rescue effect. These and other applications will be evident to one of ordinary skill in the art in view of this disclosure.

As disclosed in the above referenced U.S. Pat. No. 6,317, 029, "IN-SITU REMOTE SENSING", and in U.S. Pat. No. 6,396,819, "LOW-COST SATELLITE COMMUNICATION SYSTEM", also referenced above, these applications are particularly well suited for satellite-relay configurations, wherein a satellite 270 receives the composite signal from all of the transmitters within view of the satellite 270 and relays the composite information to a base station 200, in either a 'store-and-forward' mode, when the remote stations 280a-c and the base station 200 are not contemporaneously in view of the satellite 270, or in a 'bent-pipe' mode, wherein the satellite 270 receives the information from the remote stations 280a-c and merely retransmits the information to the base station 200, typically at a different transmission frequency. Because the satellite 270 and base station 200 can be configured with directional antennas, a significant gain in signal to noise ratio can be achieved by such a configuration, without requiring a directional antenna at each remote station 280a-c. In the aforementioned area coverage embodiment, such as sensors throughout an airport or harbor, the receiving system would typically be located at the protected area, perhaps using multiple receivers/repeaters that forward their signals to a hub, or to individual receiver/detector sub-systems. For the purposes of this invention, the signal 281 that is received at the base station 200 is considered to be the composite of the individual transmissions 281a-c, regardless of whether this composite 281 is relayed through one or more relays, such as a satellite 270, and regardless of whether it is received by a single receiver or multiple receivers.

Figure 3:
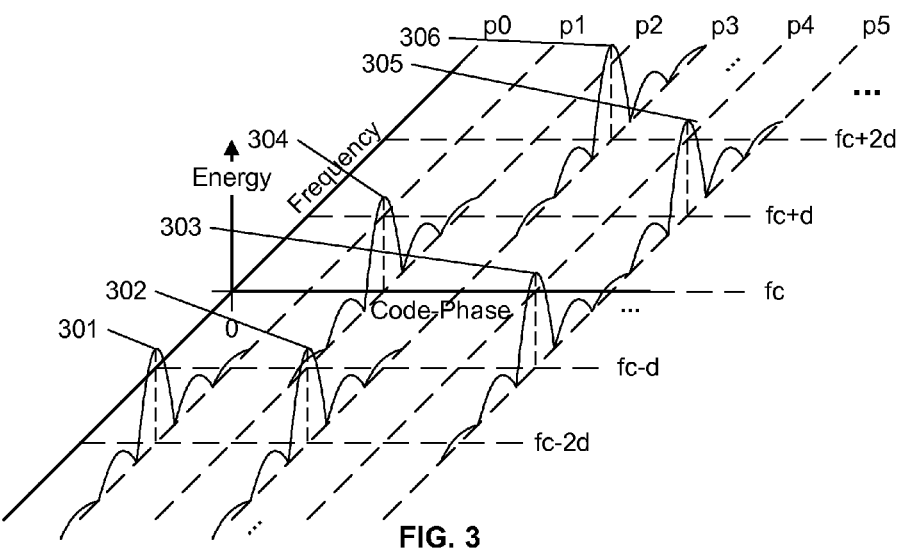
FIG. 3 illustrates an example plot of energy distribution as a function of transmission frequency and code-phase relative to the receiver in accordance with this invention.

FIG. 3 illustrates an example plot of energy levels within a composite signal as a function of frequency and code-phase. That is, the plot indicates the energy that would be detected if a particular spreading code were applied to a signal that was transmitted at a particular frequency. Ideally, since each transmitter is transmitting at the same nominal frequency fc, each energy distribution would be centered on the frequency fc in FIG. 3. However, a variance among transmit and receive frequencies results in a distribution of energy distributions within a band about the nominal frequency fc, within a maximum allowable band about fc.

In addition to the distribution of transmit frequencies about the nominal frequency fc, each transmitter operates asynchronously to the receiver, and thus the received energy distributions occur at different code-phases relative to the receiver.

That is, the energy is transmitted, but will not be discerned except when the receiver applies the code at the particular phase.

As can be seen, each transmitter's energy distribution 301-306 can be identified as occurring at a particular (frequency, phase) pair, relative to the receiver. That is, one of the transmitters is transmitting at the nominal frequency fc and produces the energy distribution 303; this energy will be detected when the receiver applies the code to the received signal at code-phase p3. Each of the other transmitters produces an energy distribution that is offset from the nominal frequency fc, at various code-phases. That is, in this example, the received energy distribution 301 occurs at frequency fc−2d and is detectable at code-phase p1; energy distribution 302 occurs at this same frequency, but is detectable at code-phase p4; energy distribution 303 occurs at fc−d, detectable at phase p3; and so on. Note that the illustration of FIG. 3 is a simplified diagram that is intended to facilitate understanding of the underlying principles of this invention; one of ordinary skill in the art will recognize that the energy distributions is continuous in the phase dimension as well as the frequency dimension. For example, the energy lobe 301 that is illustrated as occurring at frequency fc−2d and phase p1 may actually be representative of a portion of an actual 'volume' of energy that is centered at some frequency between fc−2d and fc−d, and at some phase that is between p1 and p2, and extends in both the frequency and phase dimensions.

In accordance with this invention, individual transmission streams are discriminated based on the energy content at each frequency and code-phase. Each coincidentally transmitted message that is sufficiently separated from other messages, in frequency or in code-phase, can be discriminated from the other messages using the techniques disclosed herein. That is, in FIG. 3 the energy is illustrated as a two-dimensional energy distribution, and each example transmission occurs at discrete frequencies and phases (fc−2d, fc−d, fc, fc+d, fc+2d: p1, p2, p3, etc.). In reality, the detectable energy is a continuous function of both frequency and code-phase, and the detection system of this invention is configured to accommodate variances, as discussed further below.

In a typical deployment of multiple transmitters, the distribution of coincident transmissions may overlap to an extent that the individual transmissions producing the overlap may not be discernible. As discussed above, the principles of this invention are particularly well suited for applications wherein the transmissions from individual transmitters are infrequent and substantially redundant; that is, in applications wherein most reported information items are not substantially different from their recent predecessors, such as location-reporting transmissions, or environment-reporting transmissions. The principles of this invention are also particularly well suited for applications wherein a change in the reported information is not extremely time sensitive, such as reporting a change in the security status of a remote location, wherein the inherent delay in responding to the change at this remote location is substantially larger than a possible delay in reporting the change. In such applications, the likelihood of interference is slight because of the infrequency of transmissions, and, most significantly, the likelihood of repeated interferences over a long time period is extremely slight, because of the inherent variances among inexpensive transmitters.

As used herein, a "long time period" is one that includes many transmissions from each transmitter. For example, if a hundred transmitters are deployed that are configured to transmit a one second message every minute or so, a few minutes would likely constitute a long time period, because the likelihood that two transmitters will transmit their messages during the same second, at the same frequency, and at the same phase, relative to the receiver, would be slight, and the likelihood of this happening repeatedly is extremely slight, given the typical variance of factors among low-cost transmitters. In like manner, if each transmitter is event-driven, and is configured to send a series of repeated transmission only upon the occurrence of a change of status, the likelihood of transmissions will be dependent upon the number of deployed transmitters and the likelihood of each event, and, in most situations, the likelihood of multiple event-triggered transmissions at the same time, same frequency, and same phase will generally be extremely slight.

Thus, depending upon the application, the likelihood of receiving at least a single message from each transmitter that is distinguishable in frequency or code-phase from other transmissions over a given time period can be extremely high. Conventional statistic techniques can be applied to determine the expected likelihood of receiving at least a single message from each transmitter, based on the number of deployed transmitters, the expected rate and duration of the transmissions from the transmitters, the length of the code (number of distinguishable phases), the expected variance in frequencies among the transmitters, and the expected frequency discrimination within the receiver. One of ordinary skill in the art will recognize that other factors, or alternative factors, may also be used to determine a minimum time period for achieving a desired reliability of receiving a distinguishable message from each transmitter.

Referring back to FIG. 2, the receiver 210 receives the composite signal 281 and down-converts the composite signal 281 to a plurality of baseband signals 211, each down-conversion frequency being within a given range of the nominal transmit frequency, the range being dependent upon the expected variance of frequencies among the transmitters. The preferred number of down-converters is based on the given range and the selectivity/bandwidth of each down-converter, to assure that the entire range is adequately covered. One of ordinary skill in the art will recognize that alternative schemes can be used to down-convert signals from transmitters that are transmitting within the given range of a nominal frequency; for example, a single down-converter can be used if there is sufficient time to down-convert each required frequency in a sequential manner.

The receiver 210 provides the baseband signals 211 to the message discriminator 220. Within the message discriminator 220, a phase detector 230 corresponding to each baseband signal (i.e. each transmit frequency) determines the code-phase(s) 235 that contain(s) substantial signal energy, as discussed further below. Each phase detector 230 provides this (these) code-phase(s) 235 to a demodulator 250, along with the input baseband signal 211. The demodulator 250 thereby receives each (frequency, code-phase) pair that indicates the presence of a message from one of the remote transmitters 280a-c.

The demodulator 250 receives the baseband signal 211 that is provided by a particular down-converter 215, and the phase(s) 235 at which substantial energy was detected within this particular baseband signal 211. The demodulator 250 decodes each baseband signal 211 at each of these code-phase(s) 235 to produce a decoded signal corresponding to each of these (frequency, code-phase) pairs. Given that substantial energy has been detected in this frequency-based signal 211 at each identified code-phase 235, each decoded signal is assumed to correspond to a segment of a particular transmitted message 282a-c. The demodulator 250 routes each decoded signal from each (frequency, code-phase) pair into a corresponding queue 260, thereby forming strings of messages in each queue 260, corresponding to each transmitted message 282a-c.

Although the discriminator 220 is illustrated as containing multiple phase detectors 230, to allow the detectors 230 to process the output of each down-converter 215 in parallel, one of ordinary skill in the art will recognize that a single phase detector can be used, if there is sufficient time to sequentially detect each phase within each down-converted signal 211. Preferably, the efficiency of the discriminator 220 is such that it allows the detection process to be accomplished via software running on a general purpose processor, or on a signal processor, as well as via conventional hardware devices.

Figure 4:
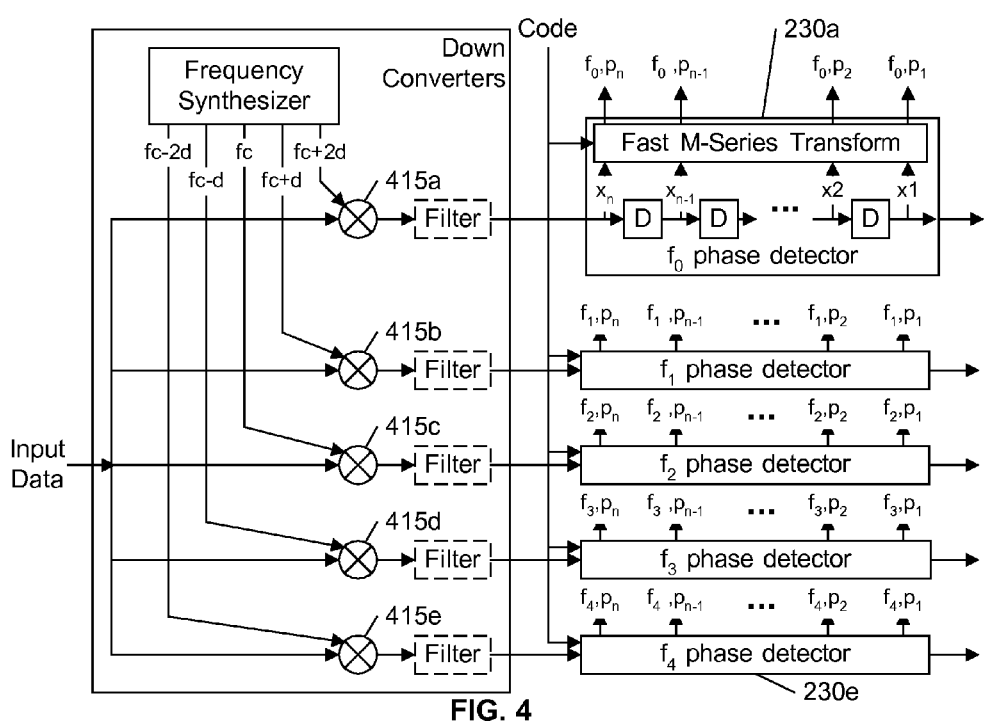
FIG. 4 illustrates an example block diagram of a frequency and phase detection system in accordance with this invention.

FIG. 4 illustrates an example block diagram of an arrangement of down-converters and phase detectors in accordance with this invention. The frequency band of +/−F about the nominal transmit frequency is partitioned into a number (M) of discrete frequencies, nominally spaced by a space d, where d is generally equal to 2*F/(M−1). Non-uniform spacing may also be used. The spacing d, and therefore the number M, is determined based on the filter characteristics of the detector, as well as the characteristics of the transmitters, using techniques common in the art. The filter characteristics are selected such that the band-pass width of the filter is at least as wide as the main lobe of the transmission energy distribution (301-306 in FIG. 3) during the detection period, and d is selected such that an energy distribution that occurs at a center frequency that is half-way between two discrete frequencies is not substantially attenuated, thereby allowing it to be detected at either or both of the discrete frequencies. In the example of FIGS. 3 and 4, five discrete frequencies are used (M=5), and correspond to fc−2d, fc−d, fc, fc+d, and fc+2d, where d is approximately F/2.

A digital form of the composite input signal, typically provided by a sampler, is provided to each multiplier 415a-e to effect the down-conversion at each of the discrete frequencies. That is, the output of each multiplier is a baseband signal that corresponds to the sampled energy content about each discrete frequency at each sampled time. Referring to the example of FIG. 3, the output of the multiplier 415a, corresponding to fc+2d will include the energy from the main lobe of transmission 306, as well as the significantly smaller amount of energy from the side lobe of transmission 305. The output of the multiplier 415e will include the energy from the main lobes of each of the transmissions 301 and 302, as well as the smaller amount of energy from the side lobe of transmission 303.

Depending upon the filter characteristics of the multipliers 415a-e and the desired filter characteristics of each down-conversion, additional filtering may be applied to each down-converted signal. Commonly, the input sampling period corresponds to a sub-multiple of the duration of each code-phase; in such case, the filters also integrate these multiple samples to provide a single output sample corresponding to each code-phase period. As noted above, because each code-phase period is less than or equal to half the chip period, this sampling assures that the information content of each transmitted signal is recovered. In a preferred embodiment, a code-phase period that is equal to half a chip period is used, to optimize the processing of the sampled down-converted signals.

The sampled down-converted signals are provided to corresponding phase detectors 230 of FIG. 2 that are configured to identify the presence of substantial energy in each signal at each code-phase. The term 'correlation' is generally used to indicate a detection of substantial energy at a given code-phase. In the example of FIG. 3, the processing of the down-converted signals at frequency fc−2d, for example, will show a correlation of the down-converted signal to code-phases p1 and p3, corresponding to the energy lobes 301 and 302. With regard to FIG. 4, the outputs $(f_4,p_1)$ and $(f_4,p_3)$ of the $f_4$ phase detector 230e, will indicate this correlation to the down-converted signal from down-converter 415e, while the other outputs $(f_4, p_2)$, $(f_4, p_4)$, and so on, will indicate a lack of correlation, or a lesser amount of correlation, at these code-phases. Due to the fact that each code-phase corresponds to half a chip period or less, the correlation will generally span multiple adjacent code-phases, as is typical of most, if not all, spread spectrum phase detection systems.

A preferred embodiment of the phase detector 230 is illustrated in the block diagram of the $f_0$ phase detector 230a in FIG. 4. The sequence of code-phase sampled signals from down-converter 415a is provided to a string of registers until samples of all of the code-phases of the code are loaded. When an entire code sequence is loaded, these samples are provided to a conventional "Fast M-Sequence Transform", also known as a "FMT", "Walsh-Hadamard Transform", "Walsh Transform", or "Hadamard Transform". The Fast M-Sequence transform identifies the correlation at each code-phase using a series of additions and inversions, and can be used if the spreading code is a maximum length sequence, or M-Sequence.

Figure 5:
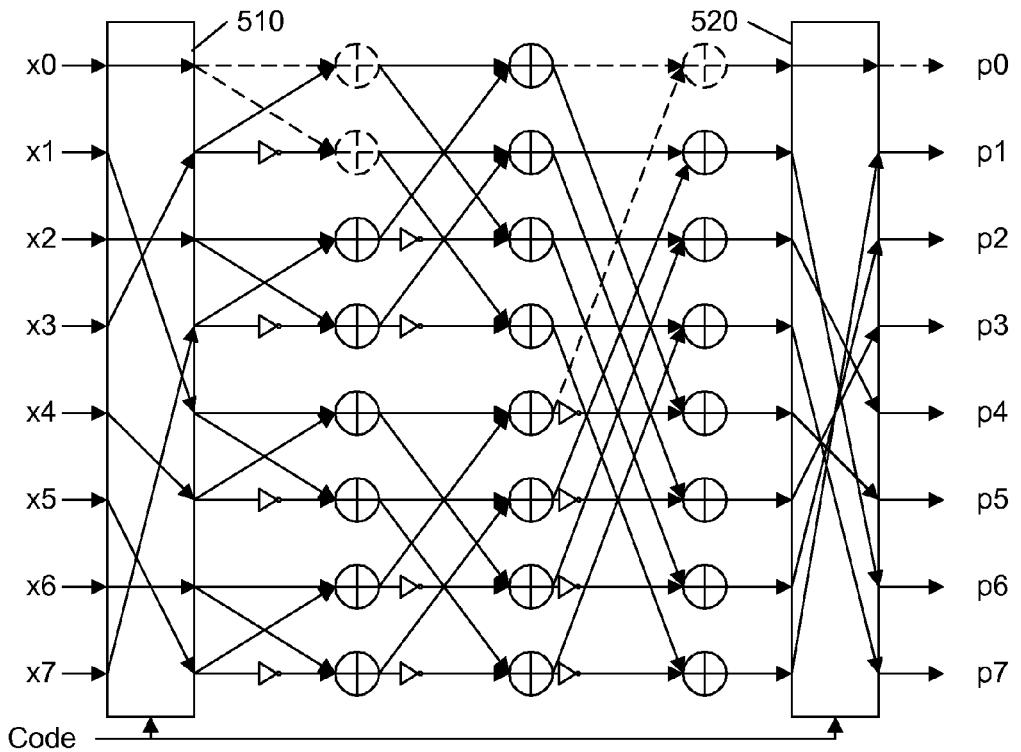
FIG. 5 illustrates an example block diagram of a Fast M-Sequence Transform configured for use in phase detection system in accordance with this invention.

FIG. 5 illustrates an example block diagram of an 8-input, 8-output Fast M-Sequence Transform. As is known in the art, the Fast M-Sequence Transform includes a "butterfly network" of adders and inverters, flanked at the input and output by a switching matrix, or "scrambler" 510, 520. The input scrambler 510 routes each code-phase input $x_1$-$x_n$ to a particular input node of the butterfly matrix, while the output scrambler 520 routes each output of the butterfly matrix to a 'code-phase correlation' output $p_1$-$p_n$. The routing within the scramblers 510 and 520 is uniquely defined by the particular M-Sequence code. If a correlation exists between the input $x_1$-$x_n$ and any of the code-phases of the M-Sequence code, the output(s) of the correlated code-phase(s) $p_1$-$p_n$ will indicate this correlation.

Because of its binary symmetry, a Fast M-Sequence Transform has a number of inputs and outputs that is a power of two, whereas a maximum-length sequence has a length that is one less than power of two; thus one or more of the inputs and outputs to the Fast M-Sequence Transform are effectively unused. Using dashed lines, FIG. 5 illustrates components and connections that can be eliminated from the conventional butterfly network when it is used in a Fast M-Sequence Transform.

Returning to FIG. 2, each phase detector 230 (or one or more phase detectors 230 that process the down-converted signal from multiple down-converters 215), forwards the down-converted signal 211 to a demodulator and queue controller 250, along with the identification of the phase(s) of the code that exhibit correlation with the input signal 281 at the corresponding down-converted frequency. That is, the controller 250 receives an identification of each (frequency, phase) pair that exhibits substantial energy at that (frequency, phase) pair, as well as the input signal that provided this energy. The queue controller 250 thereby allocates a queue to each (frequency, phase) pair that exhibits substantial energy, and demodulates the input signal from this frequency-dependent down-converted signal 211 at the given code-phase. If the given (frequency, phase) pair has been assigned a given queue, then the new information from this (frequency, phase) pair is added to the queue; otherwise a determination is made regarding whether to assign a queue to this new (frequency, phase) pair. The messages in each queue are subsequently routed to their intended destinations, based on either a default destination address or an address that is specified in each individual message.

In an optimum-utilization embodiment, the capacity of the system is limited, and the detectors 230 provide as many (f, p) pairs as the demodulator 250 can handle, prioritized by energy content. In a preferred embodiment of this invention, the demodulator 250 is configured to determine and/or select the (frequency, phase) pairs that likely correspond to a specific transmitter. That is, for example, if, within a particular baseband signal, phases $p_{k-1}$, $p_k$, and $p_{k+1}$, indicate a correlation, the demodulator/queue-controller 250 will have embedded rules that determine that the transmission is likely from a single transmitter, and allocate a queue corresponding to the down-converted signal at frequency-phase pair (f, $p_k$). In like manner, if, within multiple frequency-adjacent signals, (frequency, phase) pairs $(f_{k-1}, p)$, $(f_k, p)$, and $(f_{k+1}, p)$ indicate a correlation, the demodulator/queue-controller 250 will have embedded rules that determine that the transmission is likely from a single transmitter, and allocate a queue corresponding to the down-converted signal at frequency-phase pair ($f_k$, p). These same rules, or similar rules, will determine whether the new (frequency, phase) pair corresponds to a previously assigned (frequency, phase) pair. In this manner, frequency and/or phase drifts caused by actual or perceived changes in frequency and/or phase are accommodated. Preferably, the demodulator/queue controller 250 associates an active-time to each queue assigned to a (frequency, phase) pair, and de-allocates the assignment after a given period of inactivity.

The above-described determination of the energy content at a given (frequency, phase) pair corresponds to the energy content of a single duration of the spreading code, hereinafter termed an "epoch". In a preferred embodiment of this invention, a plurality of epochs are used to determine the (frequency, phase) pair that corresponds to a transmission that warrants allocation to a queue and corresponding demodulation. In a straightforward embodiment, the magnitudes of the energy content at each epoch are added together and compared to a threshold value.

Due to a variety of effects, such as the Doppler effect caused by relative motion between a transmitter and receiver, the epochs from a single transmitter may drift, or 'slip' from one frequency-phase pair to an adjacent frequency-phase pair. If such effects are expected to occur, the energy-determination schemes addressed above can be modified to form a composite magnitude, based on the energy contents of a plurality of adjacent (frequency, phase) pairs in either frequency or phase. If the drift is constant or predictable, techniques can be applied to optimize the determination of the composite, by only including adjacent frequency-phase pairs in a determined direction from the initial frequency-phase pair. For example, if it is known that frequency drifts are rare, the composite energy determination may be based only on the two (frequency, phase) pairs that are adjacent in phase to the initial frequency-phase pair, rather than the eight frequency-phase pairs that are adjacent in frequency, in phase, or both.

It is significant to note some of the advantages provided by this invention, some of which are provided in the parent applications to this invention and recapped here for convenience.

Of particular note, with regard to FIG. 2, neither the transmitters 280a-c nor the receiver 200 are synchronized to each other, thereby eliminating any need for the transmitters 280a-c to contain a receiver that receives synchronization information from a transmitter at the receiver 200. This feature is particularly advantageous in satellite-relay applications, wherein a satellite 270 merely acts as a relay for communicating a composite of transmissions from autonomous transmitters 280a-c to a base station 200.

Additionally, because synchronization is not required, the messages 282a-c can be communicated without the inclusion of 'overhead bytes', such as a message preamble that typically contains a sequence of predefined message symbols that facilitate such synchronization.

In like manner, the use of autonomous transmitters that transmit relatively infrequently, and the ability to detect and decode such transmissions without synchronization obviates the need for an explicit allocation of code-phases to each transmitter 280a-c by the base station 200, as is typical in conventional spread-spectrum systems.

The absence of the need for synchronization at the base station 200 eliminates the need for synchronization devices, such as phase-locked-looped, that are dedicated to each transmission channel. In the embodiment of FIG. 2, the only transmitter-allocated resource is the queue 260 that is associated with each contemporaneous receipt of messages from a particular (frequency, phase) pair. That is, the number of transmitters supportable by a given base station 200 is limited only by the number of queues 260 available during a maximum duration of a transmitted message 282a-c. In a preferred application, the messages are short and infrequent, and the number of queues at a base station 200 is virtually limitless, thereby allowing a single base station 200 to handle a significantly large number of transmitters 280 without a corresponding significant increase in the cost of the components at the base station 200.

In a preferred embodiment, one or more full-cycles of the spreading code, termed epochs of the code, occur for each data bit, and the data bits and the spreading code are synchronous, so that the data bit transitions occur between epochs. In this manner, the data bit value is constant across each epoch, and the coherent energy is maximized. However, such synchronization is not necessarily required.

If the data and spreading code are not synchronous, data transitions can occur within the epochs. For example, if there are nominally ten epochs per data bit, nine out of ten epochs will exhibit maximal coherent energy, as the decoded voltages will be either all positive or all negative (see FIG. 1F), and the proper code-phase and data value can be determined. However, every tenth bit is likely to exhibit less coherent energy, because the sum of the decoded voltages may include a combination of positive and negative values on either side of each data bit transition. Based on the measure of coherent energy, every tenth epoch may be interpreted to be incoherent noise, rather than a data bit transition within the epoch.

Figure 6:
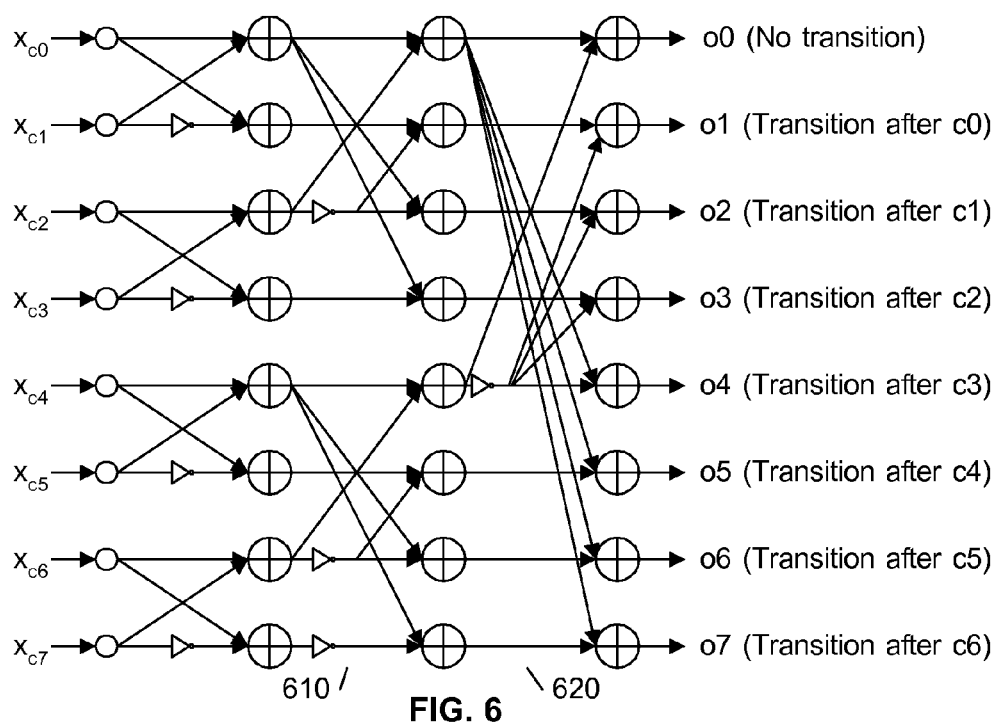
FIG. 6 illustrates an example block diagram of a butterfly matrix that is configured to detect information-bit transitions occurring during a code sequence in accordance with this invention.

FIG. 6 illustrates a transform that facilitates distinguishing a data bit transition within an epoch from the occurrence of noise during the epoch. The input to the transform is a set of decoded samples ($x_{cj}$=in(j)*c(j), where in is the sampled input and c is the spreading code), and the output is a measure of the coherent energy if a bit transition is assumed to occur at each point during the epoch corresponding to the decoded samples. That is, if the input samples are indexed from 0 to n−1, where n is the total number of samples, the output o1 assumes a transition after the first input sample, output o2 assumes a transition after the second sample, and so on.

The switch matrices 610 and 620 are arranged to sum a combination of inverted and non-inverted terms, wherein all of the samples after the assumed transition are inverted. For example, the output o2 is the sum of in(0)*c(0)+in(1)*code (1)+(−in(2)*c(2))+(−in(3)*c(3))+(−in(4)*c(4)) . . . If a transition did, in fact, occur after the first two input samples, the inversion of the values after the second sample has the effect of providing either all positive or all negative values in the sum. If a transition occurred after the first three samples, on the other hand, the above (−in(2)*c(2)) term imposes an inappropriate inversion, and the output o2 will be less than the output o3, which starts the inversions after in(2)*c(2). In general, the values of the outputs of the transform form a triangular distribution, whereas noise will form a generally random pattern. The output corresponding to the actual transition point will exhibit a maximum positive or negative value, and the other outputs will exhibit a generally monotonic decrease or increase toward zero, respectively.

The number of input terms, and thus output terms, of the transform of FIG. 6 will be based on the resolution required for identifying the transition point. That is, the example of FIG. 6 will be able to identify the transition point to within an eighth of the total epoch time, assuming that the eight inputs are uniformly spaced across the epoch. That is, if the epoch includes 128 input samples, the eight inputs should correspond to every $16^{th}$ sample (128/8).

The foregoing merely illustrates the principles of the invention. It will thus be appreciated that those skilled in the art will be able to devise various arrangements which, although not explicitly described or shown herein, embody the principles of the invention and are thus within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A receiving system comprising:
a receiver that is configured to receive a composite signal from a plurality of transmitters, each transmitter providing a transmitted signal at a different code-phase of a plurality of code-phases of a spreading code,
a down-converter that is configured to provide a baseband signal from the composite signal, and
a phase detector that is configured to identify the code-phase corresponding to each transmitter of the plurality of transmitters,
wherein the phase detector is configured to identify the plurality of code-phases by applying a plurality of samples of the baseband signal to a Fast M-Series transform that is configured based on the spreading code.

2. The system of claim 1, including
a plurality of demodulators that are each configured to demodulate the baseband signal to provide a decoded data item based on each code-phase of the plurality of code-phases, and
a plurality of queues, each queue of the plurality of queues being configured to receive the decoded data-item from a corresponding demodulator of the plurality of demodulators.

3. The system of claim 2, including a queue controller that is configured to:
receive identification of the code-phases from the plurality of phase detectors,
allocate a demodulator to each identified code-phase, and
control the demodulator to use the identified code-phase for demodulating the baseband or further baseband signal.

4. The system of claim 3, wherein the queue controller is configured to:
detect a drift of the identified code-phase, and
control the demodulator to use a modified code-phase based on the drift.

5. The system of claim 2, including
a plurality of down-converters that are configured to provide a plurality of further baseband signals based on a variance about a nominal transmission frequency common to the plurality of transmitters, and
a plurality of phase detectors, each phase detector being configured to identify further pluralities of code-phases corresponding to a plurality of further transmitters by applying a plurality of samples of each corresponding further baseband signal from a corresponding demodulator of the plurality of demodulators to a Fast M-Series transform that is configured based on the spreading code.

6. The system of claim 5, wherein
the plurality of demodulators is configured to demodulate the plurality of further baseband signals to provide a plurality of further decoded data items based on each code-phase of the further pluralities of code-phases, and
the plurality of queues is configured to receive the further decoded data-items from a corresponding further demodulator of the plurality of demodulators.

7. The system of claim 6, including a queue controller that is configured to:
receive identification of the code-phases and further code-phases from the plurality of phase detectors,
allocate a demodulator to each identified code-phase and further code-phase, and
control the demodulator to use the identified code-phase or further code-phase for demodulating the baseband or further baseband signal.

8. The system of claim 1, including
a plurality of down-converters that are configured to provide a plurality of further baseband signals based on a variance about a nominal transmission frequency common to the plurality of transmitters, and
a plurality of phase detectors, each phase detector being configured to identify further pluralities of code-phases corresponding to a plurality of further transmitters by applying a plurality of samples of each corresponding further baseband signal from a corresponding down-converter of the plurality of down-converters to a Fast M-Series transform that is configured based on the spreading code.

9. The system of claim 8, including
a plurality of demodulators that is configured to demodulate the baseband signal and the plurality of further baseband signals to provide a plurality of decoded data items based on each identified code-phase of the plurality of code-phases and further pluralities of code-phases, and
a plurality of queues that is configured to receive the decoded data-items from a corresponding demodulator of the plurality of demodulators.

10. The system of claim 9, including a queue controller that is configured to:
receive the identified code-phases from the plurality of phase detectors,
allocate a demodulator to each identified code-phase and further code-phase, and
control the demodulator to use the identified code-phase for demodulating the corresponding baseband or further baseband signal.

11. The system of claim 1, wherein the composite signal is received from a satellite system that receives the transmitted signals from the plurality of transmitters.

12. The system of claim 11, wherein the plurality of transmitters are configured to provide data from at least one of: a biological sensor, a chemical sensor, and a nuclear sensor.

13. The system of claim 12, wherein the plurality of transmitters are distributed over a geographic area.

14. The system of claim 1, wherein the receiver is common to the plurality of transmitters, and operates independent of each transmitter.

15. The system of claim 14, wherein the down-converter operates independent of each transmitter.

16. The system of claim 1, wherein each of the plurality of transmitters is configured to operate autonomously.

17. The system of claim 16, including the plurality of transmitters.

18. The system of claim 1, including a satellite system that receives the transmitted signals from the plurality of transmitters and provides the composite signal to the receiver.

19. The system of claim 18, wherein the satellite system is configured to operate in at least one of: a bent-pipe configuration, and a store-and-forward configuration.

20. The system of claim 1, including a transform that is configured to identify a time of transition of data within an epoch of the spreading code.

21. A method comprising:
receiving a composite signal that includes a plurality of transmission signals from a plurality of transmitters, each transmitter of the plurality of transmitters being configured to operate at a common nominal transmit frequency using a common spreading code,
down-converting the composite signal to form one or more baseband signals,
processing the one or more baseband signals to provide a plurality of identified code-phases corresponding to the plurality of transmission signals, and
demodulating the one or more baseband signals using each identified code-phase of the plurality of identified code-phases to form a plurality of messages corresponding to the plurality of transmission signals,
wherein the processing of the one or more baseband signals includes providing a plurality of samples of each of the one or more baseband signals to one or more Fast M-Series transforms that are configured based on the spreading code.

22. The method of claim 21, including
detecting at least one of a frequency drift and code-phase drift of at least one of the transmission signals, and
adjusting the demodulating of the one or more baseband signals to maintain a correspondence between the message and the transmission signal.

23. The method of claim 21, wherein the one or more baseband signals are formed based on an estimated variance of frequencies among the plurality of transmission signals.

24. The method of claim 21, wherein receiving the composite signal includes receiving the composite signal from a satellite system.

25. The method of claim 21, wherein the plurality of messages correspond to messages related to detection of at least one of: biological agent, a chemical agent, and a nuclear emission.

26. The method of claim 21, wherein the receiving of the composite is independent of each of the plurality of transmissions.

27. The method of claim 21, wherein the processing of the one or more baseband signals is independent of each of the plurality of transmissions.

* * * * *